United States Patent
Hughes et al.

(10) Patent No.: US 6,232,274 B1
(45) Date of Patent: May 15, 2001

(54) VISCOELASTIC SURFACTANT BASED GELLING COMPOSITION FOR WELLBORE SERVICE FLUIDS

(75) Inventors: Trevor L. Hughes, Cambridge; Timothy Gareth J. Jones, Cottenham; Gary J. Tustin, Cambridge, all of (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/209,906

(22) Filed: Dec. 11, 1998

(30) Foreign Application Priority Data

Dec. 13, 1997 (GB) .................................................. 9726334

(51) Int. Cl.$^7$ .............................. C09K 3/00; E21B 43/27
(52) U.S. Cl. ...................... 507/240; 507/239; 507/276; 507/277; 507/921; 507/922; 507/925; 166/300
(58) Field of Search ..................... 507/129, 130, 507/131, 145, 239, 240, 276, 277, 922, 921, 925; 166/308, 300

(56) References Cited

U.S. PATENT DOCUMENTS

| | | |
|---|---|---|
| 4,148,736 | 4/1979 | Meister . |
| 4,192,753 | 3/1980 | Pye et al. . |
| 4,532,052 | 7/1985 | Weaver et al. . |
| 4,615,825 | 10/1986 | Teot et al. . |
| 4,695,389 | 9/1987 | Kubala . |
| 4,725,372 | 2/1988 | Teot et al. . |
| 4,735,731 | 4/1988 | Rose et al. . |
| 4,975,482 | 12/1990 | Peiffer . |
| 5,036,136 | 7/1991 | Peiffer . |
| 5,093,448 | 3/1992 | Peiffer . |
| 5,101,903 | 4/1992 | Llave et al. . |
| 5,258,137 | 11/1993 | Bonekamp et al. . |
| 5,551,516 | 9/1996 | Norman et al. . |
| 5,929,002 * | 7/1999 | Joyce et al. ........................... 507/269 |
| 5,964,295 * | 10/1999 | Brown et al. ......................... 507/131 |
| 5,979,557 * | 11/1999 | Card et al. ............................ 166/300 |

FOREIGN PATENT DOCUMENTS 0 835 983 A2    4/1998  (EP) .

* cited by examiner

Primary Examiner—Philip Tucker
(74) Attorney, Agent, or Firm—Robin C. Nava; William L. Wang

(57) ABSTRACT

A wellbore service fluid comprising viscoelastic surfactants in combination with means for controlling the concentration of at least partially charged sites within the fluid is described.

11 Claims, 5 Drawing Sheets

VISCOELASTIC SURFACTANT BASED GELLING COMPOSITION FOR WELLBORE SERVICE FLUIDS

The present invention relates to viscoelastic surfactant based gelling compositions for weltbore service fluids. More particularly it relates to viscoelastic surfactant based gelling compositions for selectively reducing the flow of subterranean aqueous fluids into a well while maintaining the hydrocarbon production.

BACKGROUND OF THE INVENTION

Various types of wellbore fluids are used in operations related to the development, completion, and production of natural hydrocarbon reservoirs. The operations include fracturing subterranean formations, modifying the permeability of subterranean formations, or sand control. Other applications comprise the placement of a chemical plug to isolate zones or complement an isolating operation. The fluids employed by those operations are known as drilling fluids, completion fluids, work over fluids, packer fluids, fracturing fluids, conformance or permeability control fluids and the like.

Of particular interest with regard to the present inventions are fluids for water control applications: During the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

In many cases, a principal component of wellbore service fluids are gelling compositions, usually based on polymers or viscoelastic surfactants.

Viscoelastic surfactant solutions are usually formed by the addition of certain reagents to concentrated solutions of surfactants, which most frequently consist of long-chain quaternary ammonium salts such as cetyltrimethylammonium bromide (CTAB). Common reagents which generate viscoelasticity in the surfactant solutions are salts such sodium salicylate and sodium isocyanate and non-ionic organic molecules such as chloroform. The electrolyte content of surfactant solutions is also an important control on their viscoelastic behaviour.

Further references related to the use of viscoelastic surfactants as wellbore service fluids can be found for example in U.S. Pat. Nos.4,695,389, 4,725,372, and 5,551,516.

There has been considerable interest in the viscoelastic gels formed from the solutions of certain surfactants when the concentration significantly exceeds the critical micelle concentration. The surfactant molecules aggregate into worm-like micelles which can become highly entangled at these high concentrations to form a network exhibiting elastic behaviour. These surfactant gels are of considerable commercial interest, including application as oil well fracturing fluids.

The viscoelasticity of the surfactant solutions appears invariably to form rapidly on mixing the various components. The resulting high viscosities of the viscoelastic gels can make handling or placement difficult. For example, placement of a uniform surfactant gel in a porous medium is difficult since injection of the gel in the medium can lead to the separation of the surfactant from the solute by a filtration process. Any application of viscoelastic surfactant solutions which requires their transport or placement after their preparation would benefit from a method of controlling their viscosities and gel times.

The object of this present invention is therefore to provide improved compositions for wellbore service fluids based on viscoelastic surfactants. It is a specific object of the invention to provide means of controlling or delaying the build-up of viscosity in such compositions. It is a further specific object of the invention to provide such compositions for water control operations in hydrocarbon wells.

SUMMARY OF THE INVENTION

The objects of the invention are achieved by methods and compositions as set forth in the appended independent claims.

A composition in accordance with the present invention comprises viscoelastic surfactants and means of controlling the concentration of at least partially charged sites within the composition. For the purpose of this description, the term "partially charged sites" includes groups, molecules, or atoms, whether or not attached to larger molecules, of polar or ionic character. The concentration is used as a means to control or delay the onset of gelation in surfactant based viscoelastic fluids after the fluid has been mixed.

The control can be achieved by at least three different mechanisms:

the delayed release of a specific counter-ion such as the formation of the salicylate anion by ester hydrolysis;

the controlled removal of a hydrogen bonding modifier such as urea or guanidine hydrochloride in surfactant systems where hydrogen bonding provides a significant interaction between the entangled micelles; or the controlled change in the ionic composition of the surfactant solution.

The use of an internal delayed release (removal) of a reagent which promotes (inhibits) the formation of viscoelastic gels from the surfactant solutions is seen as a novel feature of the present invention.

These and other features of the invention, preferred embodiments and variants thereof, and further advantages of the invention will become appreciated and understood by those skilled in the art from the detailed description and drawings following below.

MODE(S) FOR CARRYING OUT THE INVENTION

Three different methods for delaying the gelation of concentrated surfactant solutions are described below.

Firstly, the gelation process can be delayed by the controlled release of the counter-ion into the surfactant solution. For example, an aqueous solution of the viscoelastic surfactant cetyltrimethylammonium bromide (CTAB);

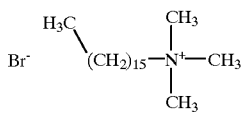

will immediately form a viscoelastic gel in the presence of the salicylate anion but not with salicylic acid or derivatives of salicylic acid such as an ester or an amide. The salicylate anion can be released from derivatives by acid or alkaline hydrolysis.

Figure 1A:
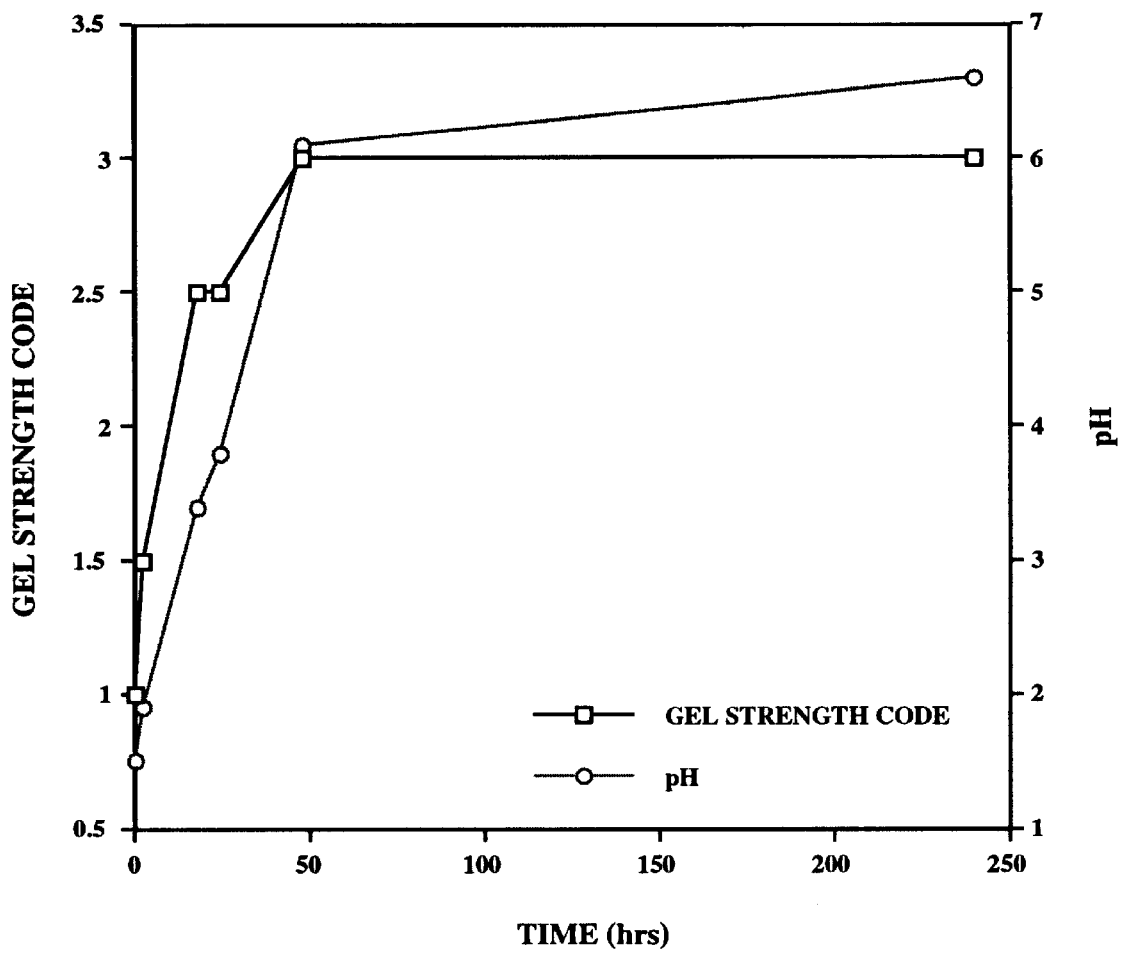
FIG. 1A shows the time dependence of gel strength and pH of a concentrated surfactant solutions

An example of the controlled development of viscoelasticity in concentrated surfactant solutions is the release of a counterion for a long-chain quaternary ammonium surfactant. The initial low viscosity fluid consisted of a 30 g/l solution of cetyltrimethylammonium chloride with 20 g/l salicylic acid, 6 g/l urea and 20 g/l sodium chloride. The solution was heated to 60° C., whereupon the urea hydrolysed and raised the pH which, in turn, released the salicylate anion from the salicylic acid and caused the surfactant solution to gel. FIG. 1A shows the development of the gel strength of the surfactant solution over a period of 240 hours. The time dependence of the pH of the solution closely follows the development of gel strength.

Figure 1B:
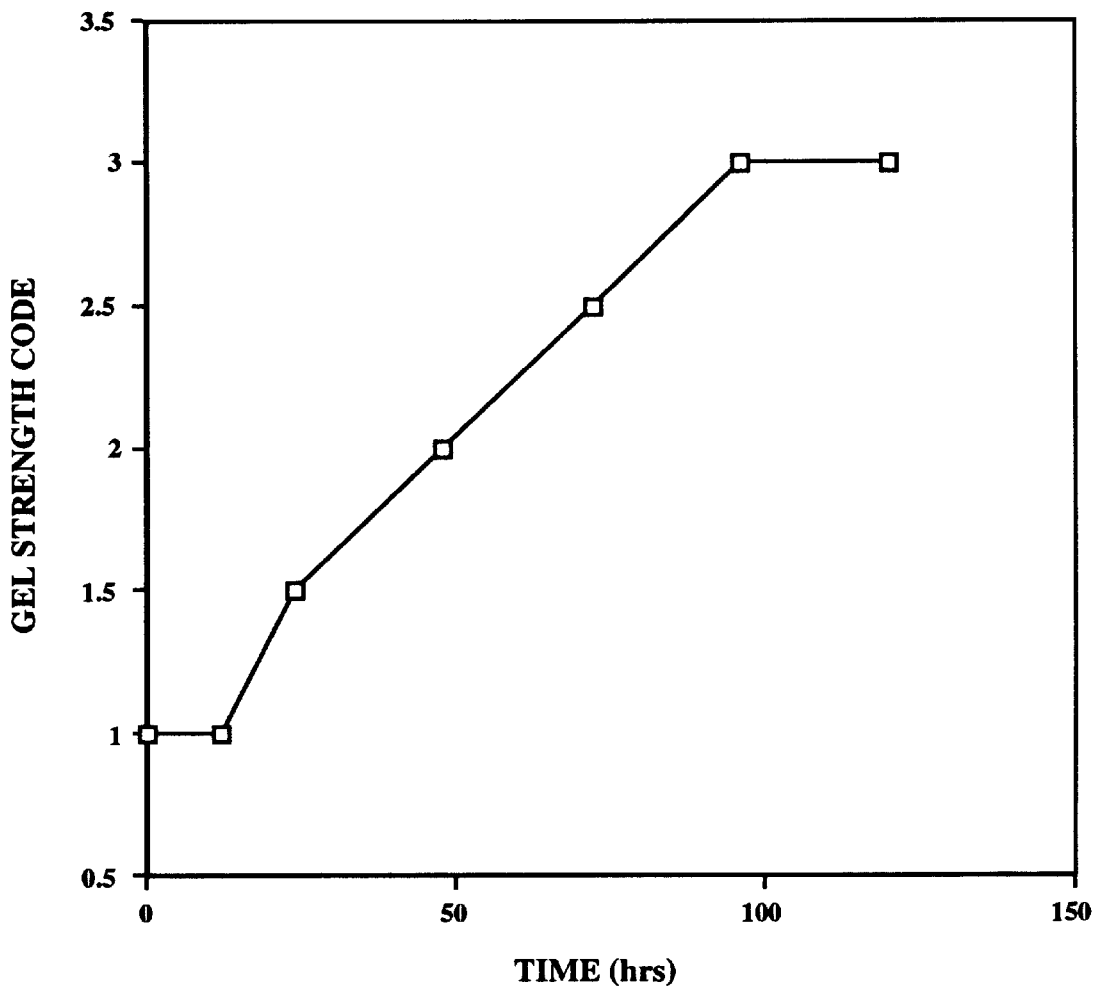
FIGS. 1B and 1C show the time dependence of gel strength of two further concentrated surfactant solutions.
Figure 2:
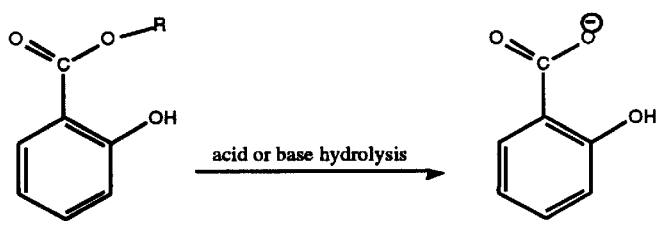
FIG. 2 illustrates the hydrolysis of a salicylate ester to form the salicylate anion or salicylic acid.

A further variant of the controlled development of the viscoelasticity in a concentrated surfactant solution through the release of a counterion is by hydrolysis of an ester. FIG. 2 shows the release of the salicylate anion (or salicylic acid) by the acid or alkaline hydrolysis of a salicylate ester where R is a suitable chemical group. The rate of hydrolysis (and hence the release of the anion or acid) can be controlled by the pH of the solution and/or the choice of the functional group R. In the case of acid hydrolysis, raising the pH by the controlled hydrolysis of a second reagent will form the salicylate anion. In an example, the surfactant solution consisted of 30 g/l cetyltrimethylammonium chloride with 20 g/l ethyl salicylate, 6 g/l urea and 5 g/l sodium hydroxide. The solution was maintained at 80° C. and the release of the salicylate anion from the salicylate ester caused the surfactant solution to gel. FIG. 1B shows the development of gel strength in the surfactant solution over a time period of 120 hours.

The second method of controlling the development of viscoelasticity is based on the control of hydrogen bonding between the entangled worm-like micelles. It has been observed that some surfactants such as N-erucyl-N,N-bis(2-hydroxyethyl)-N-methylammonium chloride.

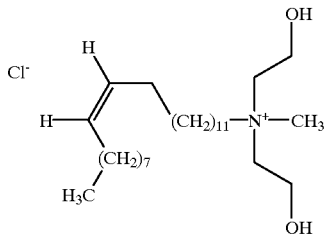

do not require the presence of a large organic anion such as salicylate to form viscoelastic solutions. At ambient temperature N-erucyl-N,N-bis(2-hydroxyethyl)-N-methylammonium chloride forms a viscoelastic solution when the concentration of a suitable electrolyte is in excess of about 0.5 weight percent.

It is assumed that hydrogen bonding between the —OH groups on the quaternary ammonium groups plays a major role in the binding of the surfactant micelles to form a viscoelastic gel. The presence of hydrogen bonding modifiers should therefore inhibit viscoelasticity in such surfactant systems. It is observed that the addition of hydrogen bonding modifiers such as urea, guanidine hydrochloride and urethane do inhibit viscoelasticity.

The additives urea, guanidine hydrochloride and urethane can be broken down by temperature or either base or acid hydrolysis whereupon the viscoelasticity of the surfactant solution can develop. The inhibitor urea can also be broken down using enzymes such as urease to yield ammonia and carbon dioxide; enzymes such as urease can decompose urea very rapidly at ambient temperatures. The use of guanidine hydrochloride may be particularly convenient since in aqueous solution the hydrogen chloride can catalyse the acid hydrolysis of the guanidine.

Figure 1C:
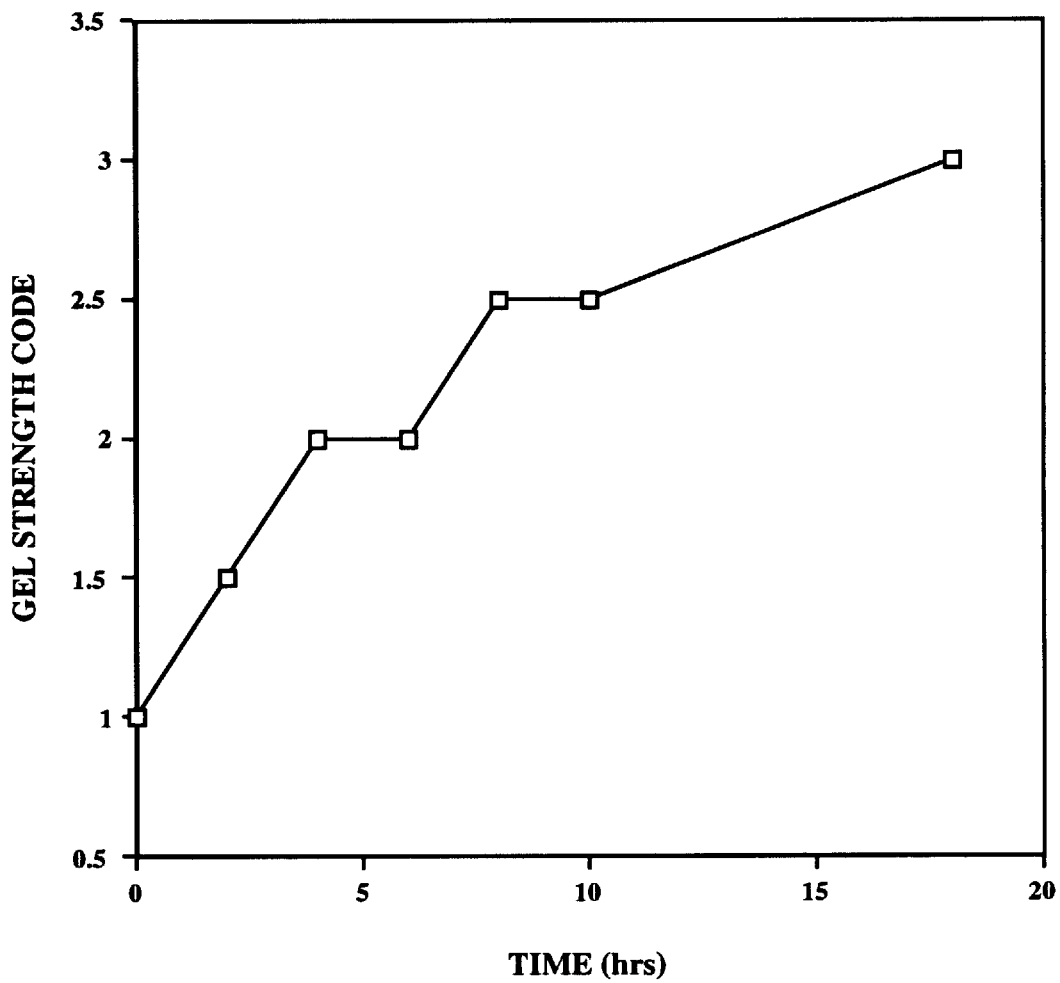

An surfactant solution to illustrate this variant consists of 30 g/l of the surfactant N-erucyl-N,N-bis(2-hydroxyethyl)-N-methylammonium chloride in an aqueous solution containing 0.5 molar urea, 10 g/l potassium chloride and 40 g/l 3-chloropropionic acid. FIG. 1C shows the development of gel strength in the solution at 60° C. The presence of the urea in the initial solution significantly weakened the hydrogen bonding between the micelles in the aqueous solution and the surfactant solution could not gel. The urea hydrolysed rapidly at elevated temperature and its decomposition allowed hydrogen bonding between the surfactant micelles to gel the solution.

The third method of controlling the onset of viscoelasticity in surfactant solutions uses the sensitivity of viscoelastic behavior to the ionic environment of the solution. One method of triggering the gelation of the surfactant solution is by formulating it with a low electrolyte concentration and then subsequently adding electrolyte to achieve the required viscosity. However, the external addition of electrolyte may not always be possible.

A second example of this variant involves the exchange of a salt which inhibits gelation with one which promotes it. For example, solutions of the surfactant N-erucyl-N,N-bis(2-hydroxyethyl)-N-methylammonium chloride will not gel in the presence of electrolytes containing carbonate, iodide, hydroxide or acetate ions but will form gels in the presence of electrolytes containing chloride, bromide, sulphate and nitrate ions.

Two techniques are proposed for the controlled gelation of surfactant solutions using changes in their ionic environments. Firstly, it is proposed to exchange the anions in the surfactant solution by replacing an anion which inhibits gelation with one which promotes it. The anion exchange can be achieved by flowing the surfactant solution through a pipe or tube, the walls of which consist of an anion exchange membrane; a counter-flow of an electrolyte containing the exchange anion is flowed on the other side of the membrane.

Figure 3:
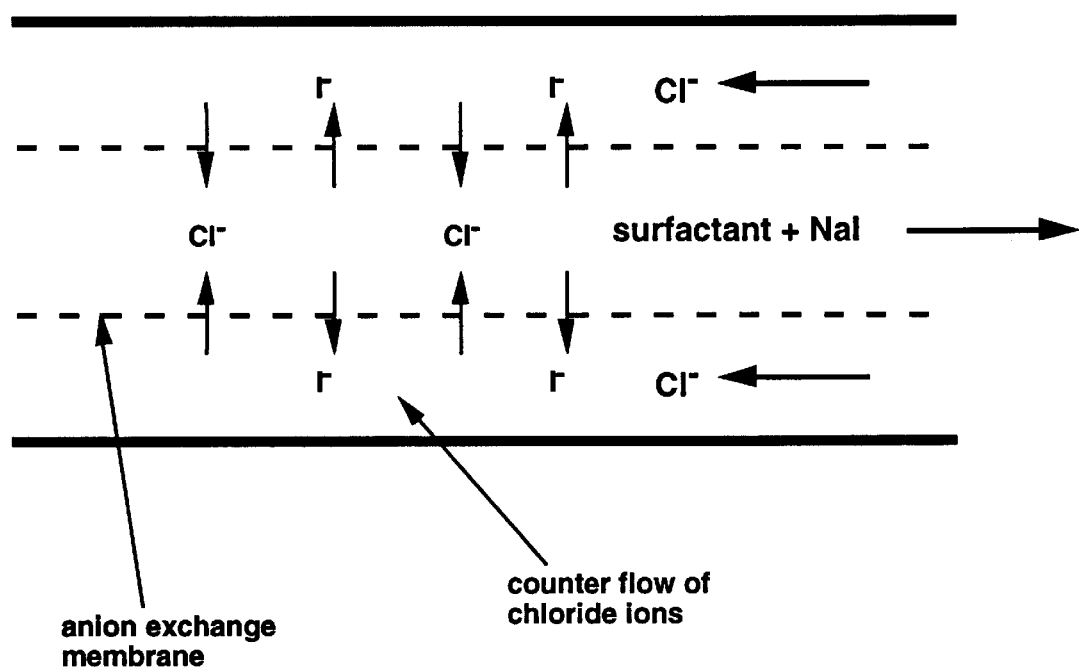
FIG. 3 shows a schematic of the proposed process using the exchange of iodide for chloride in a solution of a surfactant (e.g., N-erucyl-N,N-bis(2-hydroxyethyl)-N-methylammonium chloride) and the electrolyte sodium iodide.

FIG. 3 shows a schematic of the proposed process using the exchange of iodide for chloride in a solution of a surfactant (e.g., N-erucyl-N,N-bis(2-hydroxyethyl)-N-methylammonium chloride) and the electrolyte sodium iodide. The rate of anion exchange, and hence gelation, can be controlled by the flow rates of the two solutions and the anion diffusion rate through the anion exchange membrane.

Secondly, the anions can be exchanged directly in the surfactant solution by a controlled reaction. For example, chloride ions can be released into solution by the hydrolysis (or other reaction) of a suitable sulphonyl chloride.

Figure 4A:
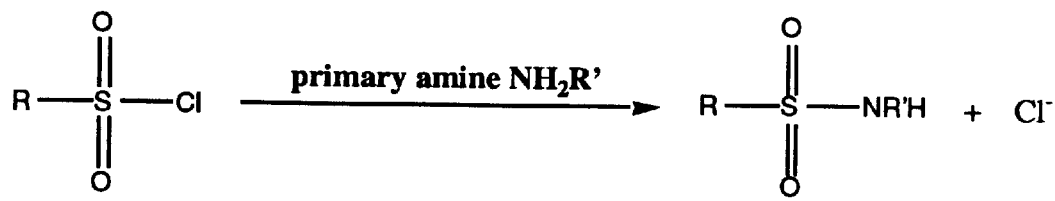
FIGS. 4A,B show two possible reactions in which chloride ions are released into the surfactant solution replacing anions.
Figure 4B:
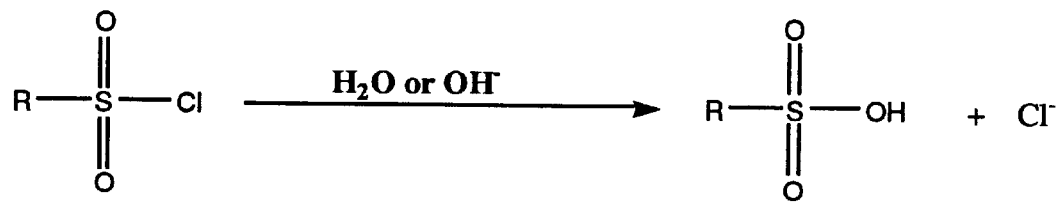

FIG. 4 shows two possible reactions in which chloride ions are released into the surfactant solution replacing anions such as carbonate and hydroxide and causing gelation. One example is the reaction of a sulphonyl chloride with a primary amine (FIG. 4A) and the second example (FIG. 4B) is water or hydroxide ions to release chloride ions into a surfactant solution for the purposes of gelation.

Other examples of surfactants which could be use for the purpose of the present invention include cetylpyridinium chloride

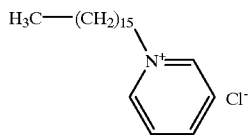

or sodium perfluorooctane1-sulphonate

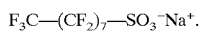

What is claimed is:

1. A wellbore service fluid comprising viscoelastic surfactants having an internal mechanism that controls the concentration of at least partially charged sites within the fluid, thereby delaying the onset of gelation of said fluid.

2. The fluid of claim 1, wherein said internal mechanism is a delayed release of a specific counter-ion.

3. The fluid of claim 1, wherein said internal mechanism is the controlled removal of a hydrogen bonding modifier.

4. The fluid of claim 1, wherein said internal mechanism is a controlled change in the ionic composition of the said surfactant.

5. The fluid of claim 2, wherein said delayed release of a specific counter-ion is the formation of a salicylate anion by ester hydrolysis.

6. The fluid of claim 3, wherein said hydrogen bonding modifier is selected from the group consisting of urea, guanidine hydrochloride, and urethane.

7. The fluid of claim 4, wherein said controlled change is by exchange of an electrolyte.

8. The fluid of claim 4, wherein said controlled change is by exchange of a salt.

9. The fluid of claim 4, wherein said controlled change is by a controlled reaction that releases chloride ions.

10. The fluid of claim 1, wherein the internal mechanism exchanges ions in the fluid.

11. A method of treating a subterranean formation penetrated by a wellbore, said method comprising the steps of injecting through the wellbore into said formation a fluid comprising viscoelastic surfactants in the presence of an internal mechanism that controls the concentration of at least partially charged sites within the fluid, thereby delaying the onset of gelation of said fluid.

* * * * *